April 13, 1948.　　　　　L. C. HALL　　　　　2,439,568
SAW GUARD
Filed April 24, 1944
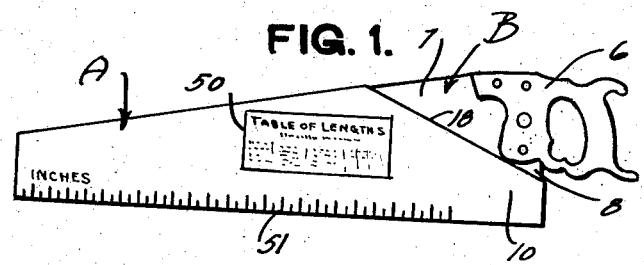
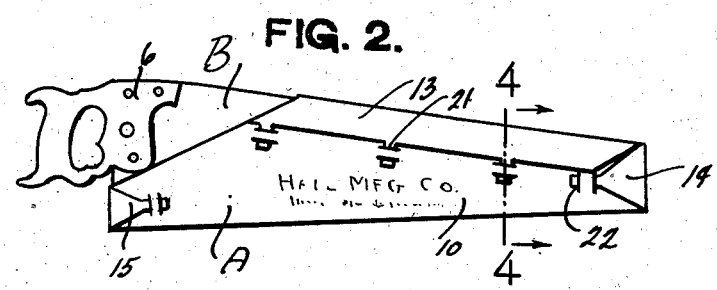
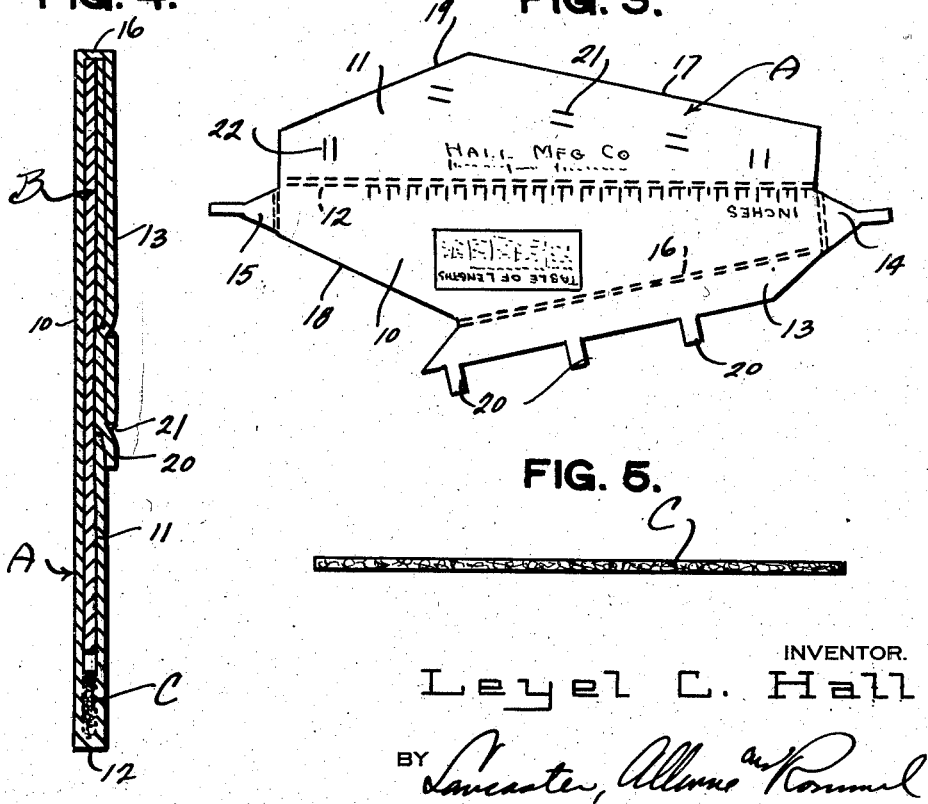
INVENTOR.
Leyel C. Hall
BY
ATTORNEYS.

Patented Apr. 13, 1948

2,439,568

UNITED STATES PATENT OFFICE 2,439,568

SAW GUARD

Leyel C. Hall, Connell, Wash.

Application April 24, 1944, Serial No. 532,553

2 Claims. (Cl. 229—88)

This invention relates to improvements in guard covers or casings for saws.

The primary object of the present invention is the provision of a relatively cheap saw guard cover or casing which can be efficiently applied upon a saw blade without the necessity of rendering the same bulky. I am aware that heretofore saw guard covers have been provided but in the main they do not take into consideration the necessity for economical fabrication of the same nor the structural features of the saw blade and handle. In my saw guard cover the same is applied merely to the blade and is of a nature to be distinctively retained thereon without unnecessary bulk.

Other objects and advantages of the invention will be apparent during the course of the following detailed description.

In the accompanying drawing, forming a part of this specification, and wherein similar reference characters designate corresponding parts throughout the several views—

Figure 1 is a side elevation of the cover as applied upon a conventional carpenter's saw.

Figure 2 is an opposite side elevation of the saw and cover.

Figure 3 is a developed view showing the flat appearance of the saw cover as it appears for compact shipping.

Figure 4 is a cross sectional view taken substantially on the line 4—4 of Figure 2.

Figure 5 is an edge view of a piece of felt or other soft material which is used as an insert in the guard casing for the protection of the saw teeth.

In the accompanying drawing, forming a part of this specification, and wherein is shown merely a preferred embodiment of the invention, the letter A may generally designate the improved saw guard casing adapted to receive a conventional carpenter's saw B.

Referring to structural features of the conventional carpenter's saw B, it will be noted that the handle portion 6 is secured as by riveting, bolts or screws to a blade 7 in such manner that the side portions of the usual plastic or wooden handle project laterally from the side surfaces of the blade, and the marginal portion 8 of the saw along which the teeth are formed extends laterally of the blade attached portion of the handle. This structural feature has been taken advantage of to effect the flat and compact assemblage of the guard casing upon the saw blade without the necessity of covering the handle and in such manner that the guard casing will be efficiently retained and cannot slip from the blade.

The cover A is fabricated of flexible heavy paper, plastic material or any approved material desired. It is structurally formed flat and in one sheet, and comprises side walls 10 and 11 connected upon a double fold line 12 (which may be indented or marked so as to permit the folding of the side walls with facility.) A top cover flap 13 is provided, and forward end retaining flap 14 and handle and retaining flap 15 are also formed contiguous with the wall 10 for purposes to be subsequently described.

In general, carpenter's saws are manufactured of a tapering width from the handle end where the blade is widest. The walls 10 and 11 taper from a point substantially midway of their ends along lines 16 and 17 towards the forward ends thereof and also taper more sharply from the midway point towards the handle end of the casing, as designated by lines 18 and 19. The decreasing taper of these side walls at the handle end of the casing eliminates the necessity of providing coverage for the bulky handle of the conventional saw. In this way the cover may be compactly assembled upon the blade and the retaining flap 15 may engage about the laterally extending portion 8 of the blade, adjacent to the handle, for the purpose of preventing slipping of the saw blade longitudinally out of the guard casing.

The top retaining flap 13 of the casing is provided with buckling straps 20 which are adapted to engage in a series of double slots 21 provided in the wall 11. Likewise the retaining tabs 14 and 15 are provided with similar buckling straps adapted to engage in double slots 22 provided in the wall 11.

The mode of assemblage is clearly designated in Figures 2 and 4 of the drawing where it is shown that the side walls lie flat in abutment with the sides of the blade of the saw; the top flap extending over the top edge of the saw blade and the straps 20 engaging in the slots 21. The forward end of the blade is guarded by the tab 14 whose strap engages in one of the slots 22. The retaining tab 15 at the handle end of the blade engages around the edge of the laterally extending portion 8 of the blade and the strap thereof engages in the slots 22. The cover is thus secured firmly upon the saw blade against liability of accidental detachment.

In the casing at the fold line 12, a strip of felt or other fibrous material C is placed. It may be secured therein in any approved manner as by stitching or by adhesive and it is preferably of a nature to be impregnated with oil or some material which will prevent corrosion and damage to the saw blade.

It is important that all parts of the cover be made of non-metallic material, although the fastening straps may be provided with suitable snap fasteners or conventional buckles in lieu of the slotted arrangement designated in the drawing.

Due to the economical manner in which the cover or casing may be fabricated as a stamping of one piece, the same is adapted for free distribution, since suitable advertisement delineations may be placed thereon, as designated in Figure 2. The outer surface of the wall 10 may be provided with suitable tables 50 such as are used by carpenters to indicate rafter cuts, mitre cuts, etc. Also the marginal edge of the wall 10 may be provided with suitable measuring delineations 51 of any approved nature.

Various changes in the shape, size and arrangement of parts may be made to the form of invention herein shown and described, without departing from the spirit of the invention or the scope of the following claims.

I claim:

1. As an article of manufacture a saw guard casing comprising spaced flexible side walls connected along an integral fold line, said side walls tapering in width from a point intermediate their ends forwardly, detachable retaining tab means for connecting said side walls together along the normal top of a saw, retaining tab means connecting said side walls at the normal forward end of the saw blade, said side walls including a rear reduced extension for folding about a portion of the rear end of the saw blade laterally of the handle.

2. As an article of manufacture a saw guard casing comprising side walls spaced to provide a pocket for receiving a saw blade, releasable fastening means detachably connecting said side walls together at the front end thereof, and releasable fastening means detachably connecting said side walls together at the opposite end thereof where the handle of the saw is normally positioned, the last mentioned fastening means being disposed close to the lower marginal portion of said side walls so as not to engage nor interfere with the handle of the saw.

LEYEL C. HALL.

REFERENCES CITED

The following references are of record in the file of this patent:

UNITED STATES PATENTS

| Number | Name | Date |
|---|---|---|
| 292,369 | Schluchtner | Jan. 22, 1884 |
| 649,768 | Sherriff | May 15, 1900 |
| 757,740 | Happe | Apr. 19, 1904 |
| 1,735,325 | L'Enfant | Nov. 12, 1929 |
| 2,084,264 | Dickson | June 15, 1937 |
| 2,234,794 | Arzet el al. | Mar. 11, 1941 |